United States Patent
Crilly et al.

(10) Patent No.: US 7,006,958 B2
(45) Date of Patent: Feb. 28, 2006

(54) METHOD FOR CONTROLLING DISTORTION OF A MATERIAL DURING A WELD PROCESS

(75) Inventors: Patrick J. Crilly, Peoria, IL (US); Yi Dong, Peoria, IL (US); Keith A. Herman, Peoria, IL (US); Yuping Yang, Dublin, OH (US); Frederick W. Brust, Columbus, OH (US); Wayne R. Tanner, Decatur, IL (US)

(73) Assignee: Caterpillar Inc., Peoria, IL (US)

( * ) Notice: Subject to any disclaimer, the term of this patent is extended or adjusted under 35 U.S.C. 154(b) by 823 days.

(21) Appl. No.: 09/729,533

(22) Filed: Dec. 4, 2000

(65) Prior Publication Data

US 2002/0019726 A1 Feb. 14, 2002

Related U.S. Application Data

(60) Provisional application No. 60/220,013, filed on Jul. 21, 2000.

(51) Int. Cl.
*G06G 7/48* (2006.01)
*G05B 13/02* (2006.01)

(52) U.S. Cl. .................. 703/7; 700/30; 700/31
(58) Field of Classification Search ........... 703/5–7, 703/2; 228/101, 103; 219/137; 700/29–31, 700/96, 145, 182, 245; 434/234
See application file for complete search history.

(56) References Cited

U.S. PATENT DOCUMENTS

| 5,293,734 A | * | 3/1994 | Mills ..................... 56/249 |
| 5,304,774 A |   | 4/1994 | Durheim |
| 5,521,354 A |   | 5/1996 | Ludewig et al. |
| 5,550,347 A | * | 8/1996 | Kasuya et al. ......... 219/137 R |
| 5,729,345 A | * | 3/1998 | Ludewig et al. ........... 356/394 |
| 5,750,957 A |   | 5/1998 | Kilty et al. |
| 5,852,273 A | * | 12/1998 | Ryudo et al. ............. 219/110 |
| 5,901,426 A | * | 5/1999 | Okazaki et al. .......... 29/407.08 |

(Continued)

FOREIGN PATENT DOCUMENTS

EP  0359585 A1  9/1989

(Continued)

OTHER PUBLICATIONS

"Welding-Induced . . . Structures", Yang Y. P., Proceedings of 2000 ASME PVP Conference, Jul. 23-27, 2000, Seattle, Washington, 6 pages.

(Continued)

*Primary Examiner—Russell Frejd*

(57) ABSTRACT

A method for controlling distortion of a material during a weld process. The method includes modeling the weld process of the material, determining distortions produced by the weld process, determining a plurality of simulated induced distortions in the model to offset the produced distortions, generating a plurality of actual induced distortions in the material as a function of the simulated induced distortions, and performing the weld process on the material.

14 Claims, 5 Drawing Sheets

U.S. PATENT DOCUMENTS

| | | | |
|---|---|---|---|
| 5,917,726 A | 6/1999 | Pryor | |
| 6,024,273 A | 2/2000 | Ludewig et al. | |
| 6,184,491 B1 | 2/2001 | Crane et al. | |
| 6,311,135 B1 * | 10/2001 | Suresh et al. | 702/43 |
| 6,324,491 B1 | 11/2001 | Zhang et al. | |
| 6,362,456 B1 | 3/2002 | Ludewig et al. | |
| 6,398,102 B1 | 6/2002 | Cao et al. | |
| 6,560,498 B1 * | 5/2003 | Shin et al. | 700/97 |
| 6,627,841 B1 | 9/2003 | Chen et al. | |
| 6,768,974 B1 | 7/2004 | Nanjundan et al. | |
| 6,789,051 B1 | 9/2004 | Chen et al. | |
| 2004/0122550 A1 | 6/2004 | Ladji et al. | |

FOREIGN PATENT DOCUMENTS

EP     0647495 A1     2/1994

OTHER PUBLICATIONS

Finite Element . . . Buckling Distortion, Michaleris P., Welding Research (Supplement to the "Welding Journal"), Nov., 1997, pp. 451-457.

* cited by examiner

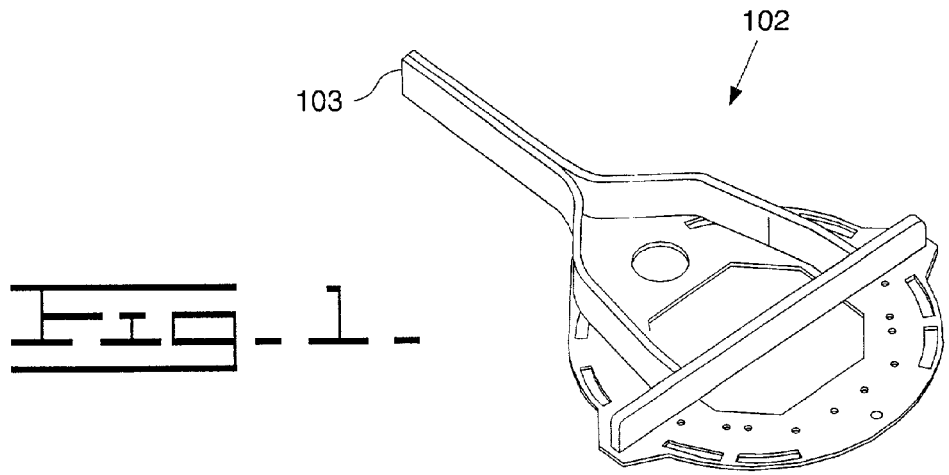
Fig-1-
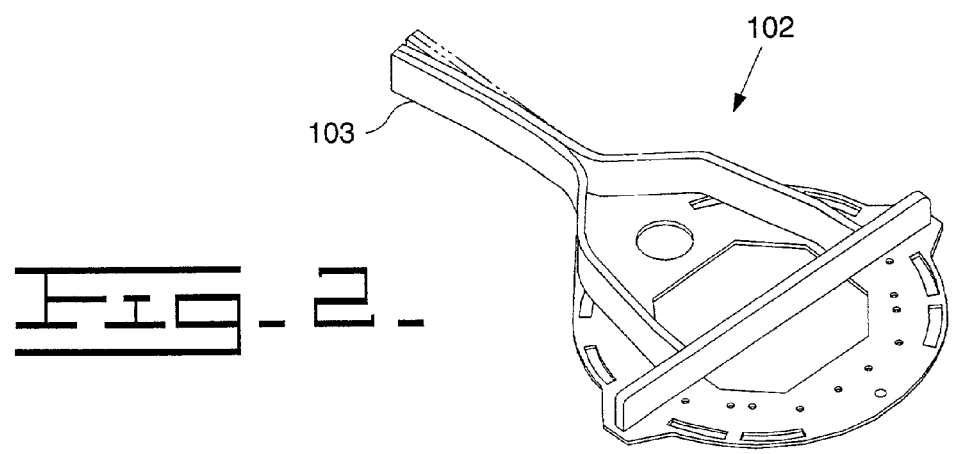
Fig-2-
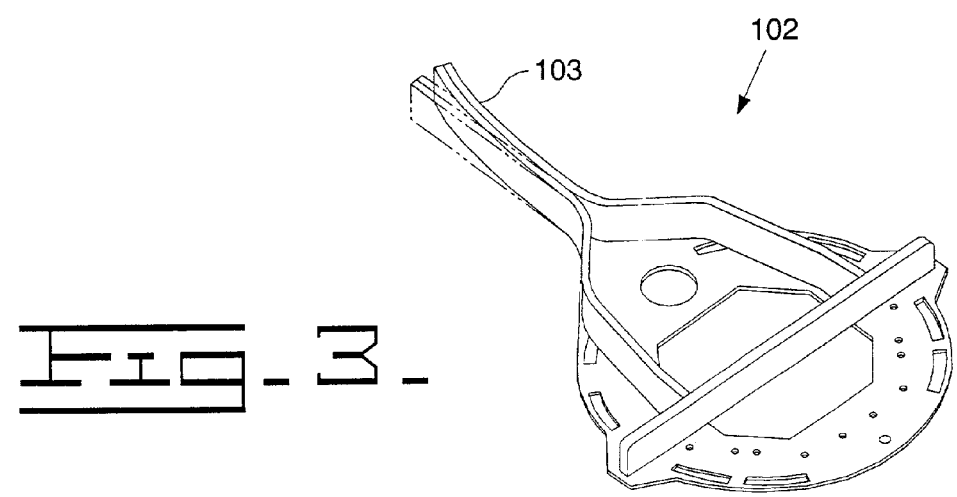
Fig-3-

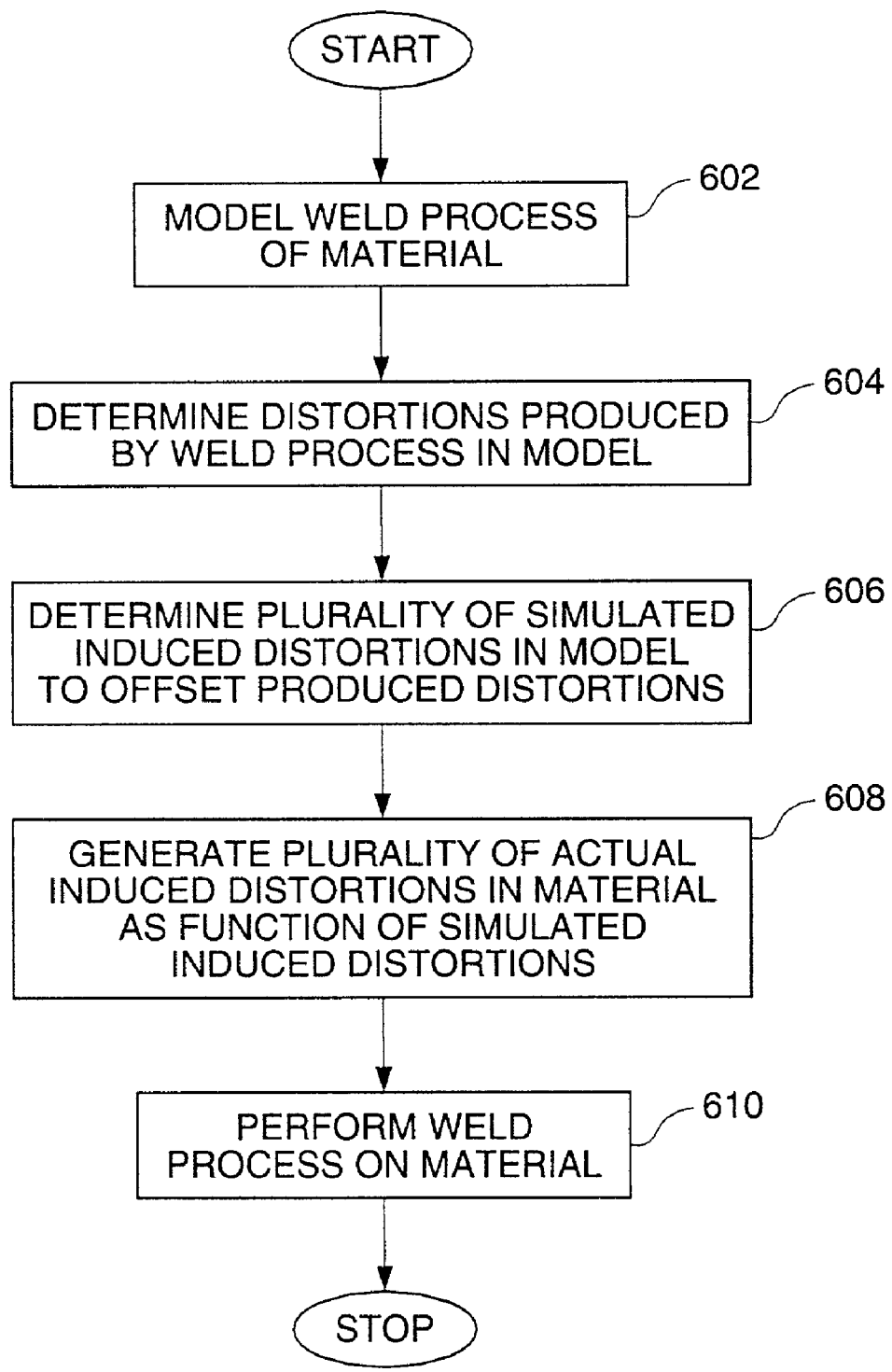

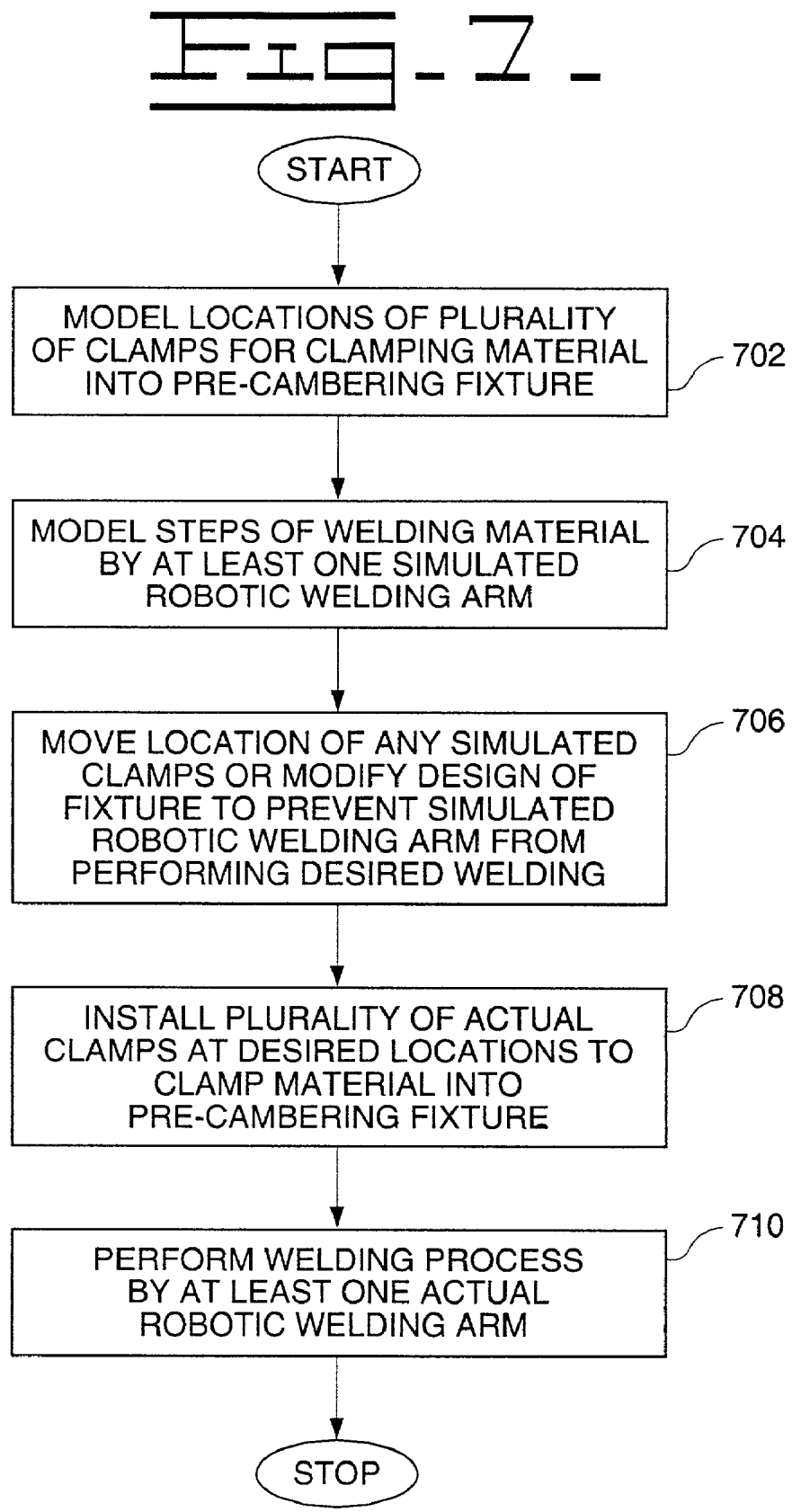

METHOD FOR CONTROLLING DISTORTION OF A MATERIAL DURING A WELD PROCESS

This application claims the benefit of U.S. provisional patent application Ser. No. 60/220,013, filed Jul. 21, 2000.

TECHNICAL FIELD

This invention relates generally to a method for controlling distortions of a material during a weld process and, more particularly, to a method for modeling the weld process to determine desired induced distortions to offset the distortions of the material.

BACKGROUND ART

Welding a material is a common and well known procedure in a manufacturing process. The material being welded, typically a metal of some type, is altered by the weld process into a form that may be at least as strong as the original material to be welded. Many industries, e.g., manufacturers of mobile machines such as earthworking machines, transport machines, and the like, rely on welding as an integral part of the manufacturing process.

The welding process, however, creates undesirable side effects in the material to be welded. Distortions occur from the intense heat being used, and the resultant material may not maintain the desired shape when welding is completed.

Therefore, in the welding industry, it is common to employ techniques prior to the weld process which induce distortions in the material which are essentially the opposite as the distortions induced by the welding process. The intent of these induced distortions is to cause the material, during welding, to distort back to the original desired shape. Techniques such as pre-cambering, i.e., bending the material into a temporary distorted shape, and pre-straining, i.e., bending the material into a permanent distorted shape, are often used.

These pre-distortion techniques, however, can only be learned by trial and error, and long-term experience. Therefore, the process becomes very costly in time and wasted material, and is cumbersome when changes in the material are made, since the trial and error process must be repeated for each change.

The present invention is directed to overcoming one or more of the problems as set forth above.

DISCLOSURE OF THE INVENTION

In one aspect of the present invention a method for controlling distortion of a material during a weld process is disclosed. The method includes the steps of modeling the weld process of the material, determining distortions produced by the weld process, determining a plurality of simulated induced distortions in the model to offset the produced distortions, generating a plurality of actual induced distortions in the material as a function of the simulated induced distortions, and performing the weld process on the material.

BRIEF DESCRIPTION OF THE DRAWINGS

FIG. 1 is a diagrammatic illustration of a material to be welded;

FIG. 2 is a diagrammatic illustration of the material of FIG. 1 including induced distortions;

FIG. 3 is a diagrammatic illustration of the material of FIG. 1 including weld distortions;

FIG. 6 is a flow diagram illustrating a preferred method of the present invention; and FIG. 7 is a flow diagram illustrating a further embodiment of a preferred method of the present invention.

BEST MODE FOR CARRYING OUT THE INVENTION

Figure 4:
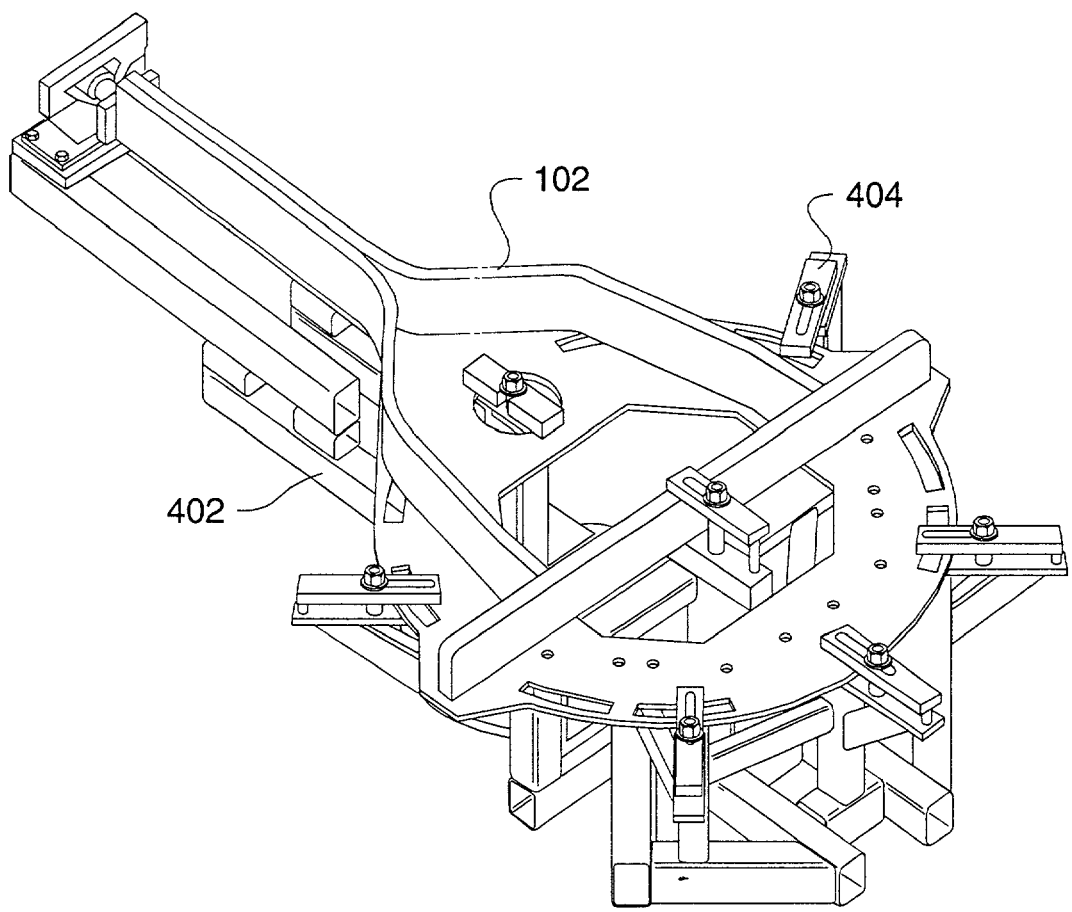
FIG. 4 is a diagrammatic illustration of the material of FIG. 1 clamped into a fixture.

Referring to the drawings, and with particular reference to FIGS. 1–3, a method for controlling distortion of a material 102 during a weld process is disclosed.

FIG. 1 illustrates a material 102 to be welded. The shape and features of the material 102 are for illustrative purposes only. The material 102 may be of any shape desired, and have any features desired. A protruding portion 103 of the material 102 is shown to illustrate with clarity distortions that occur with relation to the present invention. However, it is noted that many portions throughout the material 102 may be subjected to distortions during the weld process.

In FIG. 2, the protruding portion 103 is shown bent in a substantially leftward direction due to forces caused by induced distortions. Examples of induced distortions include, but are not limited to, pre-cambering distortions, i.e., bending the material into a temporary distorted shape, and pre-straining distortions, i.e., bending the material into a permanent distorted shape. Induced distortions, as they relate to the present invention, are discussed in more detail below.

In FIG. 3, the protruding portion 103 is shown bent in a substantially rightward direction due to forces caused by weld distortions. Historically, it is desired to introduce induced distortions, as exemplified in FIG. 2, for the purpose of counteracting the distortions caused by the welding process, as exemplified in FIG. 3, thus resulting in a finished welded material that approximates the original condition of FIG. 1 as closely as possible.

It is noted that the respective leftward and rightward directions of the induced and weld distortions are for purposes of illustration only. The distortions introduced during welding may cause the material to change shape and other properties in any of a multitude of ways.

Referring to FIG. 4, the material 102 is illustrated as being clamped into a pre-cambering fixture 402 by means of a plurality of clamps 404. For purposes of clarity, only one clamp 404 is identified by element number in FIG. 4. However, it is apparent that a number of clamps 404 are used at various positions to hold the material 102 into the pre-cambering fixture 402.

Pre-cambering is well known in the art and will not be discussed further except to note that the material 102 is clamped into the pre-cambering fixture 402 to induce temporary distortions in the material 102 until the welding process is completed. An alternate method of inducing distortions is pre-straining, which is also well known in the art and involves inducing permanent distortions by bending the material 102 in a desired manner so that the welding process causes the material 102 to distort back to a desired final configuration. Since the pre-straining process induces permanent distortions, a clamping fixture is generally not needed.

Figure 5:
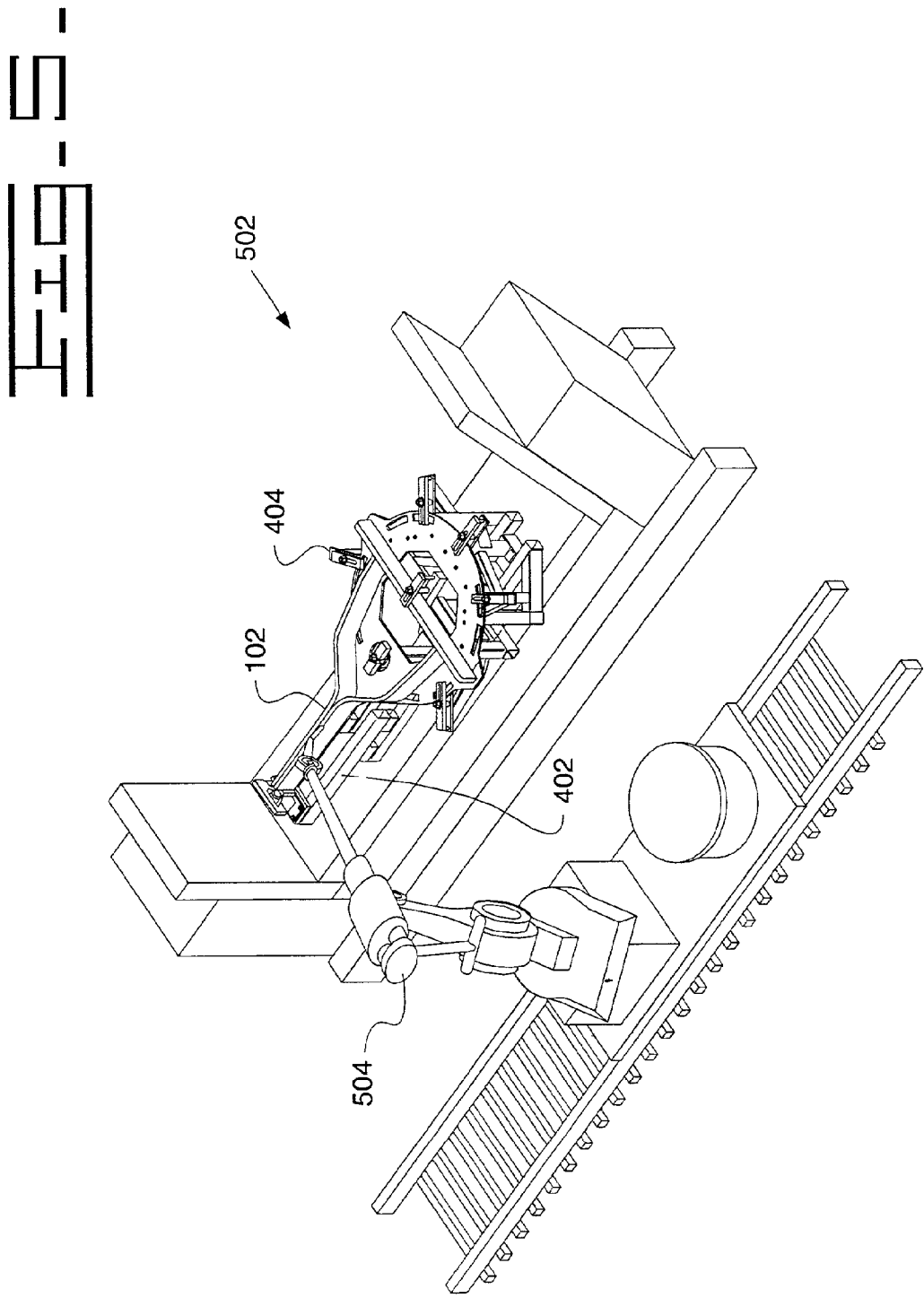
FIG. 5 is a diagrammatic illustration of a weld process on the material of FIG. 1.

Referring to FIG. 5, the material 102 mounted in the pre-cambering fixture 402 is shown located at a robotic welding station 502. It is becoming increasingly more common to automate welding processes at manufacturing facilities. Advances in robotic technologies have made automated welding an economical, reliable, and desirable alternative to manual welding procedures.

A robotic welding arm 504 is free to move about the robotic welding station 502 in a controlled manner to perform the welding steps needed on the material 102. However, as discussed in more detail below, the clamps 404 which hold the material 102 in the pre-cambering fixture 402 must be positioned so that they do not interfere with the movement of the robotic welding arm 504 or the welding being performed by the arm 504. Furthermore, the overall configuration of the fixture 402 must be designed so that interference with the movement of the robotic welding arm 504 does not take place.

Referring to FIG. 6, a flow diagram illustrating a preferred method of the present invention is shown. As will be made evident from the below discussion of the preferred method, the present invention is designed to model the distortions induced prior to welding and during welding in a simulation environment before any actual welding takes place. The simulation of the distortions provides a means to determine the desired distortions to induce which would result in the final welded material 102 to have the desired shape and characteristics. The present invention, therefore, is designed to eliminate the previous trial and error methods of determining the amount of induced distortions to use.

In a first control block 602, the weld process of the material 102 is modeled. This model takes into account characteristics and dimensions of the material 102, as well as other characteristics such as the type of welding procedure, the temperatures introduced, the duration of the heat produced, and such.

In a second control block 604, the distortions produced by the weld process on the material 102 are determined. Preferably, the distortions are determined by finite element analysis of the material 102 during welding. Finite element analysis techniques of a weld process are well known in the art and will not be discussed further. However, the distortions may alternatively be determined by any of a number of other analytical or numerical analysis techniques.

In a third control block 606, a plurality of simulated induced distortions are determined in the model which would offset the distortions introduced by the above described simulated weld process. In the preferred embodiment, the finite element analysis approach is used to determine the induced distortions at a plurality of finite element locations to achieve an overall model of the induced distortions needed. Alternatively, an analytical or some other numerical analysis approach may be used to determine the induced distortions.

In a fourth control block 608, the simulated induced distortions are used as a model to generate a plurality of actual induced distortions in the material 102. Preferably, if pre-cambering techniques are used, the material 102 is clamped into the pre-cambering fixture 402 at desired clamp locations to hold the material 102 in the desired distorted position until welding is completed. Alternatively, if pre-straining techniques are used, the material 102 is bent permanently into the desired distorted shape in preparation for the welding process. This bending may be accomplished using standard well known techniques, such as stamping, bending, hammering, and the like.

In a fifth control block 610, the actual weld process on the material 102 is performed. Preferably, the distortions introduced by welding counteract the induced distortions, and the final outcome of the material 102 is such that the desired finished shape is restored, thus minimizing any distortions from the welding process.

Referring to FIG. 7, an alternate embodiment of the preferred method of the present invention is illustrated in a flow diagram. The embodiment of FIG. 7 typically applies when pre-cambering distortions are used, and is designed to eliminate interference during an automated weld process.

In a first control block 702, the locations of the plurality of clamps 404 are modeled as a function of the determined desired pre-cambering induced distortions from the model described with respect to FIG. 6.

In a second control block 704, the steps needed to perform the welding operation are modeled using a simulation of at least one robotic welding arm 504. More specifically, the desired movements of the robotic welding arm 504 to perform the welding operation are simulated.

In a third control block 706, a determination is made if any of the modeled clamps 404 would interfere with the movement of the robotic welding arm 504 or with the welding process performed by the robotic welding arm 504. Any clamps 404 which would interfere must be moved to a new location without modifying the desired induced distortions. In addition, the configuration of the pre-cambering fixture 402 is analyzed to determine any potential interference between the robotic welding arm 504 and the fixture 402. For example, the pre-cambering fixture 402 would include a plurality of locations (not shown) which would provide support against the material 102 as the clamps 404 are applied. These support locations must not be allowed to interfere with the movement and operation of the robotic welding arm 504. Alternatively, the movement and operation of the robotic welding arm 504 may be altered to eliminate the interference.

In a fourth control block 708, a plurality of actual clamps 404 are installed at the desired locations to clamp the material 102 into the pre-cambering fixture 402 to induce the desired pre-cambering distortions without providing interference to the robotic welding arm 504.

In a fifth control block 710, the actual welding process is performed on the material 102 by at least one actual robotic welding arm 504. It is noted that the typical welding process in a manufacturing environment is repetitive, so that the above modeling and simulation steps only need be performed once for mass production of the welded material 102, until any changes are made, such as changes in the shape, dimensions, or characteristics of the material 102 to be welded, or changes in the welding process itself.

INDUSTRIAL APPLICABILITY

The present invention, as described above, provides a method for controlling distortion of a material 102 during a weld process by modeling and simulating the process prior to any actual welding taking place. The simulation offers an economical and reliable means to determine any desired induced distortions which would offset any actual distortions introduced by the weld process. The present invention takes advantage of known modeling techniques, such as finite element, analytical, or some other numerical analysis, as well as known characteristics of the material 102 and the weld process itself to eliminate trial and error methods historically used by the manufacturing industry.

Other aspects, objects, and features of the present invention can be obtained from a study of the drawings, the disclosure, and the appended claims.

What is claimed is:

1. A method for controlling distortion of a material during a weld process, including:
   modeling the weld process of the material;
   determining distortions produced by the weld process in the model;
   determining a plurality of simulated induced distortions in the model to offset the produced distortions;
   generating a plurality of actual induced distortions in the material as a function of the simulated induced distortions; and
   performing the weld process on the material.

2. A method, as set forth in claim 1, wherein determining a plurality of simulated induced distortions includes determining at least one of a plurality of pre-straining and pre-cambering distortions, and wherein generating a plurality of actual induced distortions includes the step of generating the at least one of the plurality of pre-straining and pre-cambering distortions.

3. A method, as set forth in claim 2, wherein generating a plurality of pre-straining distortions includes bending the material into a permanent distorted shape.

4. A method, as set forth in claim 2, wherein generating a plurality of pre-cambering distortions includes bending the material into a temporary distorted shape.

5. A method, as set forth in claim 4, wherein bending the material into a temporary distorted shape includes clamping the material into a pre-cambering fixture adapted to hold the material in the temporary distorted shape.

6. A method, as set forth in claim 5, further including:
   modeling the locations of a plurality of clamps for clamping the material into the pre-cambering fixture in response to the step of determining a plurality of simulated pre-cambering distortions;
   modeling the steps of welding the material by at least one simulated robotic welding arm;
   modifying the pre-cambering fixture to prevent interference to the at least one simulated robotic welding arm from performing the desired welding;
   installing a plurality of actual clamps at the desired locations to clamp the material into the pre-cambering fixture; and
   performing the welding process by at least one actual robotic welding arm.

7. A method, as set forth in claim 6, wherein modifying the pre-cambering fixture includes moving the location of at least one simulated clamp.

8. A method for controlling distortion of a material during a welding process, including:
   modeling the weld process of the material;
   determining distortions produced by the weld process in the model;
   determining a plurality of simulated pre-straining distortions in the model to offset the produced distortions;
   generating a plurality of actual pre-straining distortions in the material as a function of the simulated pre-straining distortions; and
   performing the weld process on the material.

9. A method, as set forth in claim 8, wherein generating a plurality of pre-straining distortions includes bending the material into a permanent distorted shape.

10. A method for controlling distortion of a material during a weld process, including:
    modeling the weld process of the material;
    determining distortions produced by the weld process in the model;
    determining a plurality of simulated pie-cambering distortions in the model to offset the produced distortions;
    generating a plurality of actual pre-cambering distortions in the material as a function of the simulated pre-cambering distortions; and
    performing the weld process on the material.

11. A method, as set forth in claim 10, wherein generating a plurality of pre-cambering distortions includes bending the material into a temporary distorted shape.

12. A method, as set forth in claim 11, wherein bending the material into a temporary distorted shape includes clamping the material into a pre-cambering fixture adapted to hold the material in the temporary distorted shape.

13. A method, as set forth in claim 12, further including:
    modeling the locations of a plurality of clamps for clamping the material into the pre-cambering fixture in response to the step of determining a plurality of simulated pre-cambering distortions;
    modeling the steps of welding the material by at least one simulated robotic welding arm;
    moving the location of any simulated clamps which prevent the at least one simulated robotic welding arm from performing the desired welding;
    installing a plurality of actual clamps at the desired locations to clamp the material into the pre-cambering fixture; and
    performing the welding process by at least one actual robotic welding arm.

14. A method for controlling distortion of a material during a weld process, including:
    modeling the weld process of the material;
    determining distortions produced by the weld process in the model;
    determining a plurality of simulated pre-cambering distortions in the model to offset the produced distortions;
    modeling the locations of a plurality of clamps for clamping the material into a pre-cambering fixture;
    modeling the steps of welding the material by at least one simulated robotic welding arm;
    moving the location of any simulated clamps which prevent the at least one simulated robotic welding arm from performing the desired welding;
    installing a plurality of actual clamps at the desired locations to clamp the material into the pre-cambering fixture and responsively generate a plurality of actual pre-cambering distortions in the material; and
    performing the welding process by at least one actual robotic welding arm.

* * * * *